(12) United States Patent
Kawaguchi et al.

(10) Patent No.: US 10,989,864 B2
(45) Date of Patent: Apr. 27, 2021

(54) OPTICAL FIBER, COATED OPTICAL FIBER, AND OPTICAL TRANSMISSION SYSTEM

(71) Applicant: Sumitomo Electric Industries, Ltd., Osaka (JP)

(72) Inventors: Yuki Kawaguchi, Osaka (JP); Yoshiaki Tamura, Osaka (JP); Hirotaka Sakuma, Osaka (JP)

(73) Assignee: SUMITOMO ELECTRIC INDUSTRIES, LTD., Osaka (JP)

(\*) Notice: Subject to any disclaimer, the term of this patent is extended or adjusted under 35 U.S.C. 154(b) by 0 days.

(21) Appl. No.: 16/919,262

(22) Filed: Jul. 2, 2020

(65) Prior Publication Data

US 2020/0333528 A1 Oct. 22, 2020

Related U.S. Application Data

(63) Continuation of application No. PCT/JP2018/047271, filed on Dec. 21, 2018.

(30) Foreign Application Priority Data

Jan. 11, 2018 (JP) .............................. JP2018-002523

(51) Int. Cl.
*G02B 6/02* (2006.01)
*G02B 6/036* (2006.01)

(52) U.S. Cl.
CPC ..... *G02B 6/02019* (2013.01); *G02B 6/02395* (2013.01); *G02B 6/03611* (2013.01); *G02B 6/03627* (2013.01)

(58) Field of Classification Search
CPC ............ G02B 6/02019; G02B 6/02395; G02B 6/03611; G02B 6/03627
See application file for complete search history.

(56) References Cited

U.S. PATENT DOCUMENTS 6,181,858 B1\* 1/2001 Kato .................. G02B 6/02014
385/123
9,551,828 B2 1/2017 Tachibana et al.
(Continued)

FOREIGN PATENT DOCUMENTS

CN 103257393 A 8/2013
CN 103619767 A 3/2014
(Continued)

OTHER PUBLICATIONS

T. Kato et al, "Ultra-low nonlinearity low-loss pure silica core fibre for long-haul WDM transmission", Electronics Letters, Sep. 16, 1999, pp. 1615-1617, vol. 35, No. 19.
(Continued)

*Primary Examiner* — John Bedtelyon
(74) *Attorney, Agent, or Firm* — Pearne & Gordon LLP

(57) ABSTRACT

The optical fiber has an effective area that is greater than or equal to 110 μm² and less than or equal to 180 μm² at a wavelength of 1550 nm and a cable cut-off wavelength of less than or equal to 1530 nm. An average value of a glass outer diameter in a longitudinal direction is 125±0.5 μm. When σ is a standard deviation of the glass outer diameter in the longitudinal direction, 3σ is greater than or equal to 0.1 μm and less than or equal to 0.5 μm.

8 Claims, 4 Drawing Sheets

(56) References Cited

U.S. PATENT DOCUMENTS

| | | |
|---|---|---|
| 2001/0017967 A1 | 8/2001 | Hirano et al. |
| 2002/0178762 A1 | 12/2002 | Foster et al. |
| 2011/0091178 A1 | 4/2011 | Gapontsev et al. |
| 2011/0211788 A1 | 9/2011 | Yamamoto et al. |
| 2014/0226948 A1 | 8/2014 | Enomoto et al. |
| 2014/0254997 A1 | 9/2014 | Tamura et al. |
| 2015/0226915 A1 | 8/2015 | Kawaguchi et al. |
| 2015/0251945 A1 | 9/2015 | Nakanishi et al. |
| 2015/0301277 A1 | 10/2015 | Chen et al. |
| 2015/0370008 A1 | 12/2015 | Tamura et al. |
| 2017/0017032 A1 | 1/2017 | Mishra et al. |
| 2017/0075060 A1 | 3/2017 | Kawaguchi et al. |
| 2017/0131468 A1 | 5/2017 | Kawaguchi et al. |
| 2017/0176674 A1 | 6/2017 | Long et al. |
| 2018/0074258 A1 | 3/2018 | Morita et al. |
| 2019/0278020 A1* | 9/2019 | Kawaguchi ........ G02B 6/03611 |

FOREIGN PATENT DOCUMENTS

| | | |
|---|---|---|
| CN | 104834054 A | 8/2015 |
| CN | 104981440 A | 10/2015 |
| CN | 106415344 A | 2/2017 |
| CN | 106662704 A | 5/2017 |
| EP | 3470900 A1 | 4/2019 |
| JP | 2015-000839 A | 1/2015 |
| JP | 2015-093815 A | 5/2015 |
| JP | 2017-088463 A | 5/2017 |
| JP | 2018-045028 A | 3/2018 |
| WO | 2016/074602 A1 | 5/2016 |
| WO | 2017/217559 A1 | 12/2017 |

OTHER PUBLICATIONS

M. Bigot-Astruc, et al, "Trench-Assisted Profiles for Large-Effective-Area Single-Mode Fibers", ECOC 2008, Sep. 21-25, 2008, Paper Mo.4.B.1, vol. 1-73, Brussels, Belgium.

T. Hasegawa, et al, "Hole-assisted lightguide fiber for large anomalous dispersion and low optical loss", Optics Express, Dec. 17, 2001, pp. 681-686, vol. 9, No. 13.

M. Suzuki, et al, "Low-loss Splice of Large Effective Area Fiber Using Fluorine-doped Cladding Standard Effective Area Fiber", 2017 Optical Fiber Communications Conference and Exhibition (OFC), 2017, pp. 1-3.

R. Olshansky and D. A. Nolan, "Mode-dependent attenuation of optical fibers: excess loss", Applied Optics, Apr. 1976, pp. 1045-1047, vol. 15, No. 4.

International Search Report issued in Patent Application No. PCT/JP2018/047271 dated Apr. 2, 2019.

* cited by examiner

OPTICAL FIBER, COATED OPTICAL FIBER, AND OPTICAL TRANSMISSION SYSTEM

CROSS-REFERENCE TO RELATED APPLICATION

The present application is a continuation application of International Application No. PCT/JP2018/047271, filed on Dec. 21, 2018, which claims priority to Japanese Patent Application No. 2018-002523, filed on Jan. 11, 2018. The contents of these applications are incorporated herein by reference in their entirety.

BACKGROUND OF THE INVENTION

Field of the Invention

The present disclosure relates to an optical fiber, a coated optical fiber, and an optical transmission system.

Description of the Related Art

Optical fibers used as optical transmission lines that transmit signal light in optical transmission systems desirably have low loss and low nonlinearity to increase the signal-to-noise (SN) ratio. The nonlinearity of an optical fiber may be effectively reduced by increasing the effective area of the optical fiber. The effective area of the optical fiber may be effectively increased by increasing the core diameter of the optical fiber. However, when the core diameter of the optical fiber is increased, the optical fiber propagates high-order-mode light together with fundamental-mode light, and signal degradation occurs as a result of modal interference between the fundamental-mode light and the high-order-mode light. To prevent the signal degradation due to modal interference, the cable cut-off wavelength described in Recommendation G.650.1 of Telecommunication Standardization Sector of International Telecommunication Union (ITU-T) is required to be less than or equal to the wavelength of the signal light. For example, when the signal light propagates in the C-band (1530 to 1565 nm), the cable cut-off wavelength is required to be less than or equal to 1530 nm.

Examples of known radial refractive index profiles of optical fibers that effectively serve as single-mode optical fibers at a wavelength of 1530 nm or more and that have increased effective areas include W-type and trench-type refractive index profiles. Unlike a simple-step-type refractive index profile, these refractive index profiles increase bending loss only for high-order-mode light so that the effective area can be increased while the cut-off wavelength is maintained at the desired wavelength. According to the related art, the bending loss characteristics of optical fibers have also been improved by appropriately designing and adjusting the refractive index profiles of the optical fibers. For example, see T. Kato et al., Electron. Lett., vol. 35. pp. 1615-1617, 1999, M. Bigot-Astruc, et al., ECOC 2008, paper Mo.4.B.1, or T. Hasegawa et al., OPTICS EXPRESS, vol. 9, pp. 681-686, 2001.

BRIEF SUMMARY OF THE INVENTION

An optical fiber according to the present disclosure has an effective area that is greater than or equal to 110 μm$^2$ and less than or equal to 180 μm$^2$ at a wavelength of 1550 nm and a cable cut-off wavelength of less than or equal to 1530 nm. An average value of a glass outer diameter in a longitudinal direction is 125±0.5 μm. When σ is a standard deviation of the glass outer diameter in the longitudinal direction, 3σ is greater than or equal to 0.1 μm and less than or equal to 0.5 μm. A transmission loss of the optical fiber according to the present disclosure at a wavelength of 1550 nm may be, for example, less than or equal to 0.174 dB/km.

A coated optical fiber according to the present disclosure includes the above-described optical fiber according to the present disclosure; a coating that surrounds the optical fiber and includes two protective coating layers; and a color layer that surrounds the coating and has an outer diameter that is greater than or equal to 180 μm and less than or equal to 210 μm. An optical transmission system according to the present disclosure includes the above-described optical fiber according to the present disclosure, the optical fiber serving as an optical transmission line that transmits signal light.

DETAILED DESCRIPTION OF THE INVENTION

Figure 1:
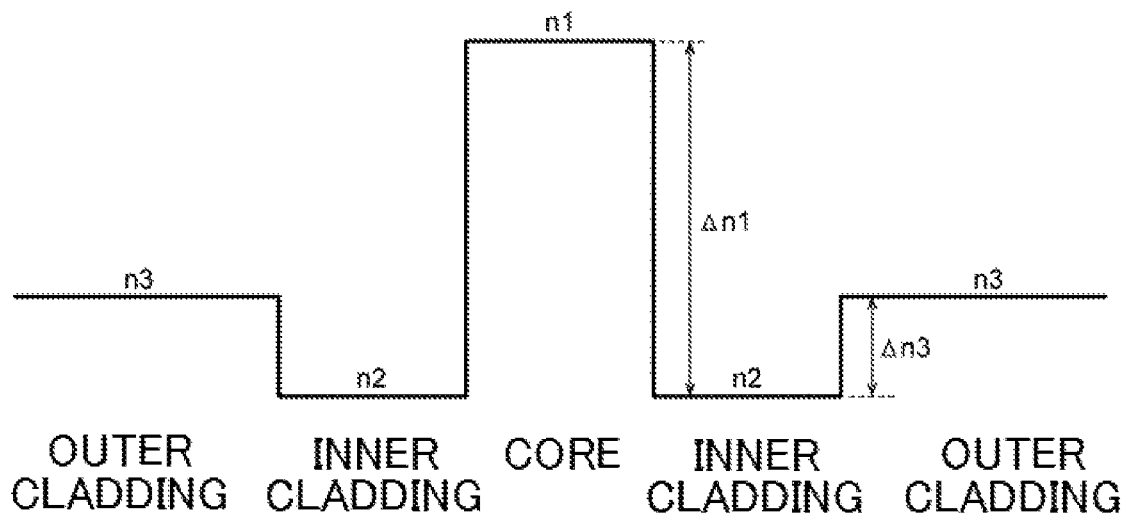
FIG. 1 is a conceptual diagram of a radial refractive index profile of an optical fiber preform.

An embodiment will now be described in detail with reference to the drawings. In the description referring to the drawings, the same elements are denoted by the identical reference numerals, and redundant description is thus omitted. The present invention is not limited to examples described below. The present invention is defined by the scope of the claims, and is intended to include equivalents to the scope of the claims and all modifications within the scope.

According to the related art, the effective area of an optical fiber has been increased and the bending loss characteristics of the optical fiber have been improved by improving the refractive index profile of the optical fiber. However, in such a case, it is difficult to improve the characteristics without making the refractive index profile complex and reducing mass productivity (manufacturing tolerance).

The variation in the glass outer diameter of an optical fiber in the longitudinal direction can be easily adjusted by adjusting conditions, for example, a drawing speed, in the step of drawing an optical fiber preform. The core diameter varies in proportion to the amount of variation in the outer diameter. As the amount of variation in the core diameter increases, the light wave that propagates through the core is more easily coupled to the cladding mode, and the leakage loss increases.

As the difference in effective refractive index between the propagated light and the cladding mode decreases, the propagated light is more easily coupled to the cladding mode. Among the propagated light, the high-order mode has an effective area larger than that of the fundamental mode. Therefore, the effective refractive index of the high-order mode is low due to the cladding having a low refractive index, and the difference in effective refractive index between the high-order mode and the cladding mode is small. Accordingly, the high-order mode easily causes leakage loss in response to the variation in glass diameter. Therefore, by appropriately controlling the range of variation in the glass outer diameter of the optical fiber in the longitudinal direction, only the scattering loss of the high-order mode can be increased while the scattering loss of the fundamental mode is maintained low. As a result, the effective area can be increased while the cut-off wavelength is maintained within a desired range.

Figure 2:
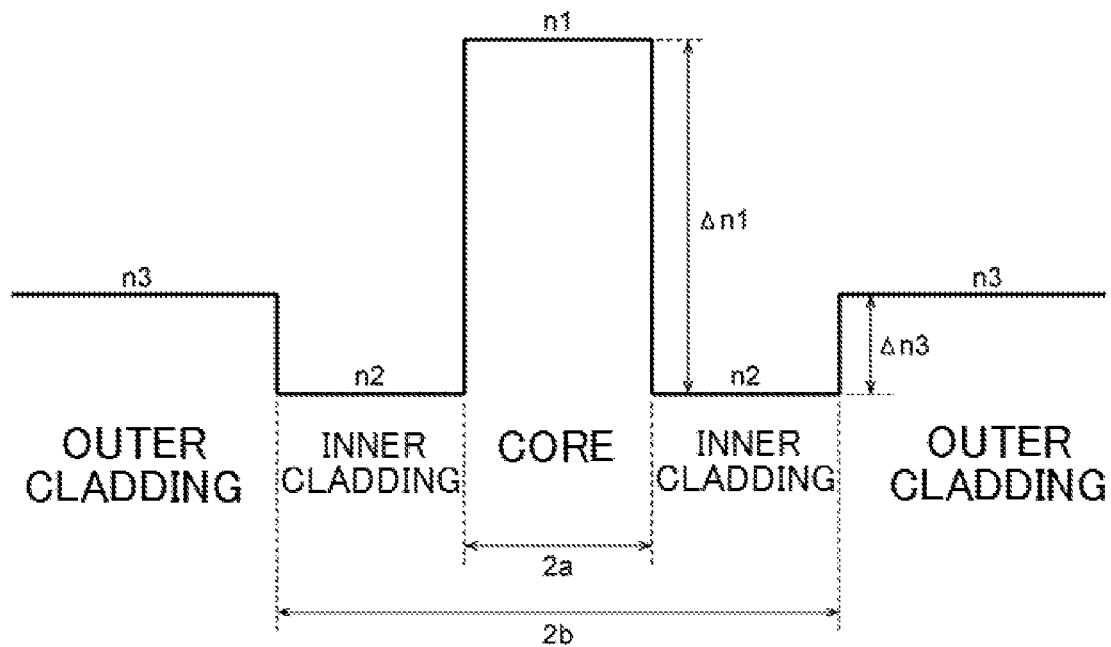
FIG. 2 is a conceptual diagram of a radial refractive index profile of an optical fiber obtained by drawing the optical fiber preform illustrated in FIG. 1.

An optical fiber having a radial refractive index profile illustrated in FIG. 2 was obtained by drawing an optical fiber preform having a radial refractive index profile illustrated in FIG. 1. In the drawing process, the glass outer diameter was monitored with a laser outer diameter monitor, and the conditions were adjusted to set the range of variation in the glass outer diameter of the optical fiber in the longitudinal direction to various values, where the range of variation was evaluated with triple the standard deviation σ of the glass outer diameter obtained with the laser outer diameter monitor at an intervals of 10 ms. The cable cut-off wavelength and the transmission loss were measured for each range of variation in the glass outer diameter.

The optical fiber illustrated in FIG. 2 includes a core having a refractive index n1, an inner cladding that surrounds the core and has a refractive index n2, and an outer cladding that surrounds the inner cladding and has a refractive index n3. The core is made of silica glass that does not contain $GeO_2$, and the inner and outer claddings are made of silica glass containing fluorine. The refractive indices satisfy the relationship n1>n3>n2. The relative refractive index difference Δn1 of the core with respect to the inner cladding is 0.32%, and the relative refractive index difference Δn3 of the outer cladding with respect to the inner cladding is 0.06%. The average value of the core diameter 2a of the optical fiber in the longitudinal direction is 12 μm. The average value of the outer diameter of the inner cladding of the optical fiber in the longitudinal direction is 36 μm. The average value of the outer diameter of the outer cladding (glass diameter) of the optical fiber in the longitudinal direction is 125±0.5 μm.

Figure 3:
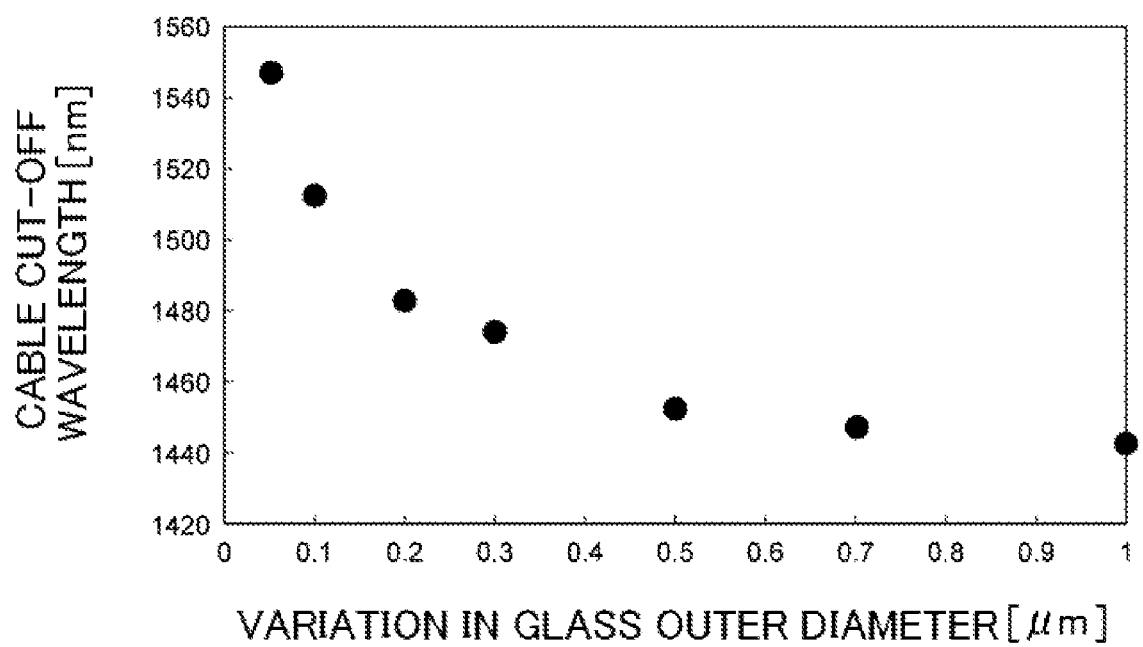
FIG. 3 is a graph showing the relationship between the range of variation in the glass outer diameter of the optical fiber illustrated in FIG. 2 in the longitudinal direction and the cable cut-off wavelength of the optical fiber.
Figure 4:
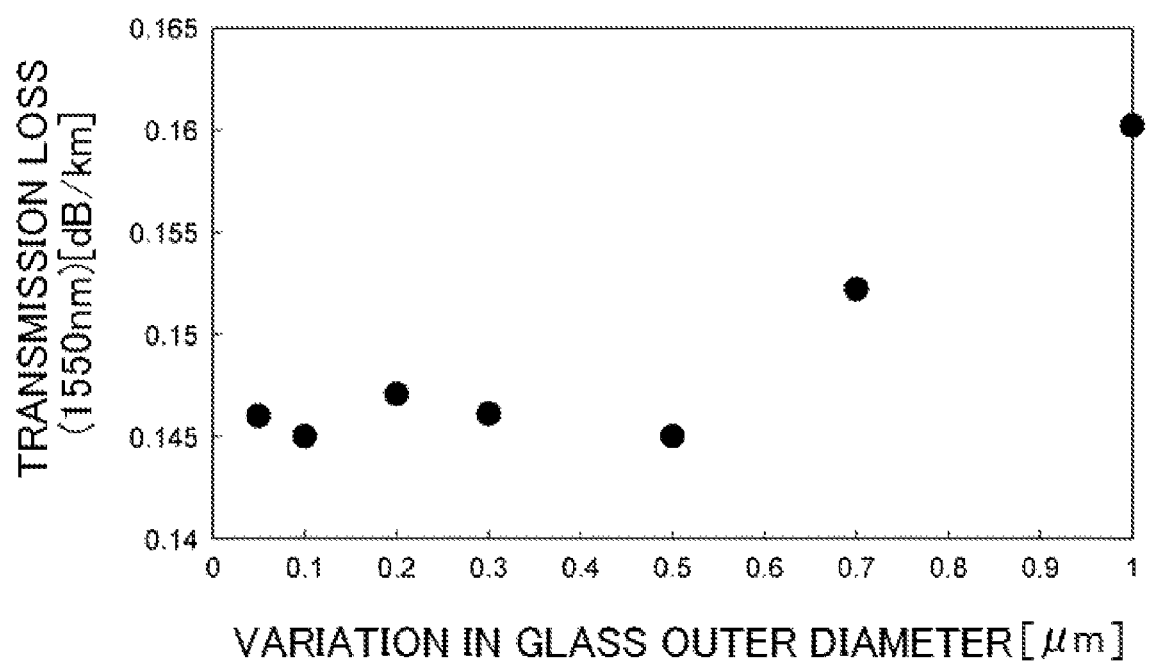
FIG. 4 is a graph showing the relationship between the range of variation in the glass outer diameter of the optical fiber illustrated in FIG. 2 in the longitudinal direction and the transmission loss of the optical fiber at a wavelength of 1550 nm.

FIG. 3 is a graph showing the relationship between the range of variation in the glass outer diameter of the optical fiber illustrated in FIG. 2 in the longitudinal direction and the cable cut-off wavelength. As the variation in the glass outer diameter increases, the cable cut-off wavelength decreases. FIG. 4 is a graph showing the relationship between the range of variation in the glass outer diameter of the optical fiber illustrated in FIG. 2 in the longitudinal direction and the transmission loss at a wavelength of 1550 nm. When the variation in the glass outer diameter exceeds about 0.5 the transmission loss at a wavelength of 1550 nm increases.

FIGS. 3 and 4 show that the effective area can be increased without significantly increasing the transmission loss when the range of variation in the glass outer diameter of the optical fiber in the longitudinal direction is greater than or equal to 0.1 μm and less than or equal to 0.5 The cable cut-off wavelength of the optical fiber is less than or equal to 1530 nm. The transmission loss of the optical fiber at a wavelength of 1550 nm is less than or equal to 0.147 dB/km. The effective area of the optical fiber at a wavelength of 1550 nm is greater than or equal to 110 $\mu m^2$ and less than or equal to 180 $\mu m^2$.

Figure 5:
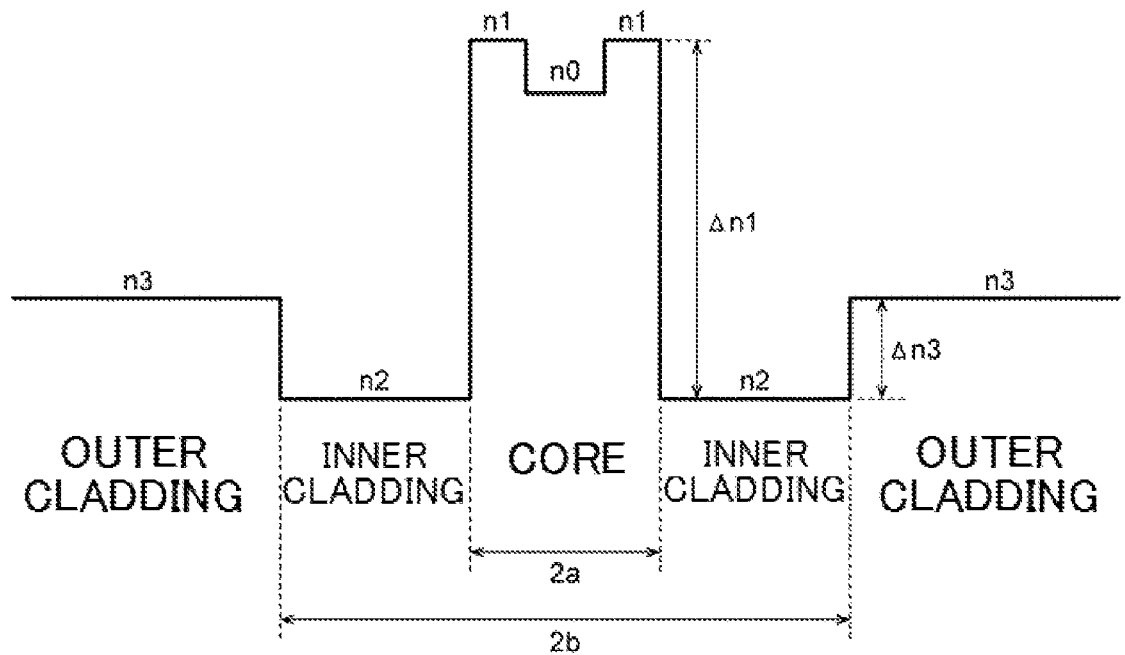
FIG. 5 is a conceptual diagram illustrating another example of a radial refractive index profile of an optical fiber according to the present disclosure.

The radial refractive index profile of the optical fiber according to the present invention is not limited to that illustrated in FIG. 2. The refractive index profile may instead be, for example, a simple-step-type, trench-type, or hole-assisted-type refractive index profile. Alternatively, the optical fiber according to the present invention may have a refractive index profile illustrated in FIG. 5. The refractive index profile illustrated in FIG. 5 is similar to the refractive index profile illustrated in FIG. 2 except that the core includes a center core and a ring core that surrounds the center core. A refractive index n0 of the center core is lower than a refractive index n1 of the ring core. Also when the optical fiber has any of the above-described refractive index profiles, the effective area can be increased without significantly increasing the transmission loss when the range of variation in the glass outer diameter of the optical fiber in the longitudinal direction is greater than or equal to 0.1 μm and less than or equal to 0.5 μm.

In particular, when the optical fiber has the refractive index profile illustrated in FIG. 5, the effective area can be increased without changing the mode field diameter. In other words, the optical fiber with reduced nonlinearity may be connected to a general single-mode optical fiber without causing a large splicing loss due to mismatching of the mode field diameters.

The present disclosure provides an optical fiber having an increased effective area and improved bending loss characteristics without making the shape of the refractive index profile of the optical fiber excessively complex. The variation in the glass outer diameter can be easily controlled by adjusting the drawing conditions, and therefore it is not necessary to design a complex refractive index profile. Accordingly, the optical fiber is expected to be suitable for mass production.

Figure 6:
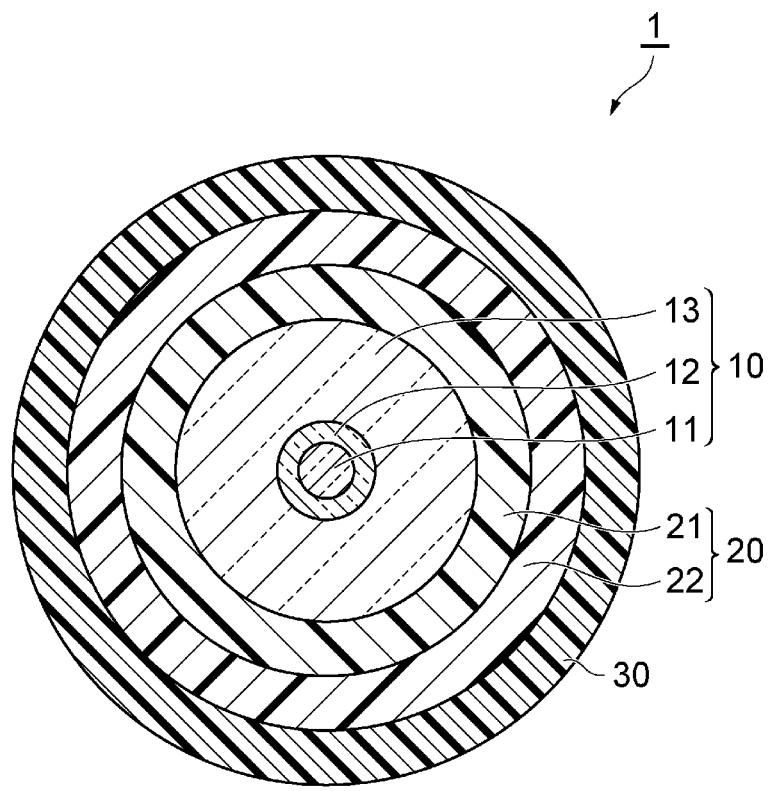
FIG. 6 is a sectional view of an example of a coated optical fiber according to the present disclosure.

As illustrated in FIG. 6, in general, a coated optical fiber 1 includes a glass fiber 10, a coating 20 that surrounds the glass fiber 10 and includes two protective coating layers 21 and 22, and a color layer 30 that surrounds the coating 20. The inner protective coating layer 21 of the coating 20 is made of a resin having a low Young's modulus, and the outer protective coating layer 22 of the coating 20 is made of a resin having a high Young's modulus. The color layer 30 is a resin layer used to distinguish the coated optical fiber 1 from other coated optical fibers, and typically has an outer diameter of about 250 μm. In recent years, attempts have been made to increase the density of coated optical fibers in an optical cable by reducing the outer diameter of each coated optical fiber (outer diameter of color layer) to about 200 μm. The coated optical fibers having small diameters are required to have improved bending loss characteristics.

The glass fiber 10 of the coated optical fiber 1 is the optical fiber according to the present disclosure including a core 11, an inner cladding 12, and an outer cladding 13. The outer diameter of the color layer 30 is greater than or equal to 180 μm and less than or equal to 210 μm. The coated optical fiber 1, which has such a small diameter, may have improved bending loss characteristics.

Figure 7:
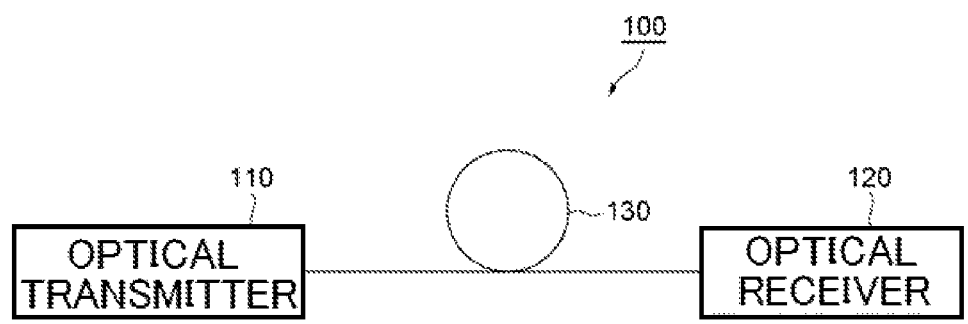
FIG. 7 is a conceptual diagram illustrating the structure of an example of an optical transmission system according to the present disclosure.

FIG. 7 illustrates the structure of an optical transmission system 100. The optical transmission system 100 includes an optical transmission line 130 that extends between an optical transmitter 110 and an optical receiver 120. The optical transmission line 130, which is included in the optical transmission system 100 and transmits signal light from the optical transmitter 110 to the optical receiver 120, includes the optical fiber according to the present disclosure. Since the optical transmission line 130 includes the optical fiber according to the present disclosure, which has an increased effective area and improved bending loss characteristics, long-distance signal light transmission with low signal degradation can be achieved.

REFERENCE SIGNS LIST

1: coated optical fiber, 10: glass fiber, 20: coating, 21, 22: protective coating layer, 30: color layer, 100: optical transmission system, 110: optical transmitter, 120: optical receiver, 130: optical transmission line

We claim:

1. An optical fiber comprising a glass portion,
the glass portion including a core and a cladding that surrounds the core and has a refractive index lower than a refractive index of the core,
wherein the glass portion has an outer diameter having an average value and a standard deviation in the longitudinal direction, the average value being 125±0.5 μm and a triple value of the standard deviation being greater than or equal to 0.1 μm and less than or equal to 0.5 μm, and
wherein the optical fiber has
an effective area that is greater than or equal to 110 μm$^2$ and less than or equal to 180 μm$^2$ at a wavelength of 1550 nm and
a cable cut-off wavelength that is less than or equal to 1530 nm.

2. The optical fiber according to claim 1, wherein
the cladding includes
an inner cladding that surrounds the core, and
an outer cladding that surrounds the inner cladding and has a refractive index higher than the refractive index of the inner cladding.

3. The optical fiber according to claim 2, wherein
the core includes
a center core, and
a ring core that surrounds the center core and has a refractive index higher than a refractive index of the center core.

4. The optical fiber according to claim 1, wherein
the optical fiber has a transmission loss of less than or equal to 0.174 dB/km at the wavelength of 1550 nm.

5. The optical fiber according to claim 4, wherein
the cladding includes
an inner cladding that surrounds the core, and
an outer cladding that surrounds the inner cladding and has a refractive index higher than the refractive index of the inner cladding.

6. The optical fiber according to claim 5, wherein
the core includes
a center core, and
a ring core that surrounds the center core and has a refractive index higher than a refractive index of the center core.

7. A coated optical fiber comprising:
the optical fiber according to claim 1;
a coating that surrounds the optical fiber and includes two protective coating layers; and
a color layer that surrounds the coating and has an outer diameter that is greater than or equal to 180 μm and less than or equal to 210 μm.

8. An optical transmission system comprising;
the optical fiber according to claim 1, the optical fiber serving as an optical transmission line that transmits signal light.

* * * * *